US009063358B2

(12) United States Patent
Li et al.

(10) Patent No.: US 9,063,358 B2
(45) Date of Patent: Jun. 23, 2015

(54) SMART PHOTOCHROMIC CHIRAL NEMATIC LIQUID CRYSTAL WINDOW

(75) Inventors: Quan Li, Stow, OH (US); Yannian Li, Kent, OH (US); Ji Ma, Kent, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 206 days.

(21) Appl. No.: 13/642,250

(22) PCT Filed: Feb. 25, 2011

(86) PCT No.: PCT/US2011/000342
§ 371 (c)(1),
(2), (4) Date: Dec. 19, 2012

(87) PCT Pub. No.: WO2011/139319
PCT Pub. Date: Nov. 10, 2011

(65) Prior Publication Data
US 2013/0093969 A1    Apr. 18, 2013

Related U.S. Application Data

(60) Provisional application No. 61/343,734, filed on May 3, 2010.

(51) Int. Cl.
| *G02F 1/1333* | (2006.01) |
| *G02F 1/137* | (2006.01) |
| *G02F 1/13* | (2006.01) |
| *B60J 3/04* | (2006.01) |
| *G02F 1/1347* | (2006.01) |
| *G02B 5/30* | (2006.01) |

(52) U.S. Cl.
CPC ............ *G02F 1/1313* (2013.01); *G02B 5/3016* (2013.01); *B60J 3/04* (2013.01); *G02F 1/13476* (2013.01); *G02F 1/13718* (2013.01); *G02F 2202/14* (2013.01)

(58) Field of Classification Search
CPC ............ G02F 1/13718; G02F 1/13305; G02F 1/133553; G02F 2202/142; G02B 27/2214; G02B 5/3016
USPC ....................... 428/1.1, 1.3; 349/16
See application file for complete search history.

(56) References Cited

U.S. PATENT DOCUMENTS

| 6,094,306 | A |  | 7/2000 | Jain | |
| 2005/0004361 | A1 | * | 1/2005 | Kumar et al. | 544/71 |
| 2005/0083564 | A1 |  | 4/2005 | Mallya et al. | |
| 2007/0237906 | A1 | * | 10/2007 | Li et al. | 428/1.2 |
| 2009/0289236 | A1 |  | 11/2009 | Destro et al. | |
| 2009/0290078 | A1 |  | 11/2009 | Yang et al. | |
| 2009/0296188 | A1 |  | 12/2009 | Jain et al. | |
| 2009/0309076 | A1 | * | 12/2009 | He et al. | 252/586 |
| 2011/0143141 | A1 | * | 6/2011 | He et al. | 428/412 |

OTHER PUBLICATIONS

Huang et al, "Spiro-oxazine photochromic fiber optical switch", Applied Physics Letters (online), 2006, vol. 88, Iss. 18, pp. 181102-1 to 181102-3.

* cited by examiner

*Primary Examiner* — Shean C Wu
(74) *Attorney, Agent, or Firm* — Hudak, Shunk & Farine Co., LPA (57) ABSTRACT

A multi-functional photochromic chiral nematic liquid crystal window comprises at least a photochromic chiral nematic liquid crystal layer. The windows are able to not only to darken in color upon exposure to sunlight irradiation but also control the light and the heat passing through them, which can be used as the windows of buildings, vehicles, and the like.

34 Claims, 4 Drawing Sheets

SMART PHOTOCHROMIC CHIRAL NEMATIC LIQUID CRYSTAL WINDOW

FIELD OF THE INVENTION

The present relates to a photochromic chiral nematic liquid crystal device, materials thereof and methods thereof. It finds particular application in conjunction with a photochromic chiral nematic liquid crystal material and smart energy-saving multifunctional window. The invented windows are able to not only darken in color from colorless upon exposure to sunlight irradiation but also control the light and the heat passing through them, and act as a privacy control. The windows can be utilized wherever desired, for example in buildings and vehicles including glass walls for offices, libraries, greenhouses, conference rooms, lobbies, store fronts, bathrooms, entryways, family rooms, bedrooms, canopy and skylights. However, it is to be appreciated that the invention is also amenable to other applications.

BACKGROUND OF THE INVENTION

Energy is the most important scientific and technological challenge facing humanity in the 21st century. In the long term, solar green energy is the only source of renewable and inexhaustible energy that has the capacity to fill humanity's technological needs. The present energy and environmental crises force people to think of innovative ways to solve problems by reducing energy consumption or increasing the use of renewable or clean energy sources. One such innovation would be the technology related to smart windows.

Conventional glass windows allow sunlight to filter through, naturally heating a room, and as a result can require an increase in the use of air conditioning, etc.

Compared with conventional glass windows, currently there are about five types of so called smart windows, i.e. liquid crystal windows, electrochromic windows, suspended particle based windows, thermochromic windows and photochromic windows.

The liquid crystal windows include polymer dispersed liquid crystal (PDLC) windows and polymer stabilized cholesteric texture (PSCT) windows, which are mainly used for privacy control. PDLC windows, which were invented at Kent State University in 1983, usually involve phase separation of nematic liquid crystal from a homogeneous liquid crystal containing an amount of polymer, sandwiched between two glasses coated with a transparent conductive material. When the electric filed is off, the liquid crystals in the window are randomly scattered. Light entering the windows does not have a clear path out. When a certain voltage is applied between the two conductive coatings, the liquid crystals homeotropically align and the window is transparent and the light can go through the window. However, PSCT windows usually include two kinds of PSCT, i.e. normal mode PSCT and reverse mode PSCT. In a normal PSCT window, on a focal conic state, light is scattered. If an electric field is applied to the liquid crystal, it turns to a homeotropic state, i.e. the liquid crystals reorient themselves parallel to each other along with the electric field and the window appears transparent, allowing light to pass through the device without light scattering. In reverse mode PSCT, the liquid crystal panel is transparent at zero electric field, whereas it is scattering (opaque) upon application of an electric field.

An electrochromic window generally comprises a metal ion conductor thin film sandwiched between two pieces of glass coated with different transparent electronic conductors. When a voltage is applied, moving ions from the counter-electrode to the electrochromic layer cause the color change. Reversing the voltage moves ions from the electrochromic layer back to the counter-electrode layer, restoring the window to its previous clear state. The glass may be programmed to absorb only part of the incident light, such as solar infrared.

Suspended particle based windows comprise microscopic molecular particles suspended in a liquid solution sandwiched between two pieces of glass coated with conducting material. When a voltage is applied the color of the window is changed to transparent, letting sunlight in. When the voltage is 'off', the particles return to rest randomly and the glass becomes tinted which is similar to the electrochromic windows.

Thermochromic windows such as those including "cloud gel" can change from a clear state to a diffused state upon heat, while reducing the transmission of solar heat. Such windows are thought to be able to reduce air conditioning costs when it's hot outside. However, a person cannot see through the window once it loses its transparency.

Photochromic windows respond to changes upon exposure to light, much like sunglasses that darken when you move from a dim light to a bright one. They work well to reduce glare from the sun, however they cannot control heat gain. For example, a photochromic window would darken more in the winter than in the summer, although solar heat would be beneficial in the winter.

Due to some problems with current window technologies, novel smart window technology with satisfactory functionality holds great promise in multi-functionality, reducing energy consumption and cutting air conditioning and heating loads in the future. Development of novel smart windows is driven by energy-efficiency demands. The Environmental Protection Agency has reported that an average household spends about 40 percent of its annual energy budget on heating and cooling costs. Office buildings now account for about one-third of all the energy used in the U.S., a quarter of which is lost through the inefficiency of standard windows to retain heat in the winter or deflect heat in the summer.

Liquid Crystals (LCs) represent a fascinating state of matter which combines order and mobility on a molecular and supermolecular level. The unique combination of order and mobility results in that LCs are typically "soft" and respond easily to external stimuli. The responsive nature and diversity of LCs provide tremendous opportunities as well as challenges for insight in fundamental science, and opens the door to various applications. The electro-optic response of rod-like or disk-like LCs, on which LC display industry is based, is just one example.

A chiral nematic LC, i.e. cholesteric LC, is a type of chiral LC with a characteristic helical structure. The helical superstructure can selectively reflect light according to Bragg's law. The wavelength $\lambda$ of the selective reflection is defined by $\lambda = np$, where p is the pitch length of the helical structure and n is the average index of refraction of the LC material. The ability of a chiral dopant to twist an achiral nematic LC phase, i.e. helical twisting power (HTP, $\beta$), is expressed in the equation: $\beta = (pc)^{-1}$ where c is the chiral dopant concentration.

A chiral nematic LC has three textures (states). A planar texture, where the director of the helical axis is perpendicular to the cell surface, can selectively reflect light, i.e. its optical state is reflective. If a low voltage pulse is applied normal to the cell surface, the focal conic texture is formed, where the director of the helical axis is more or less parallel to the cell surface. A random distribution of helical axes is characteristic of the focal conic texture which scatters the incident light in all directions. In this case, i.e. opaque state, you cannot see through the window. Furthermore, the focal conic state can block most ultraviolet rays of sunlight, which can eliminate the fading of furniture, carpets, drapes, artwork and other valuables indoors. If the electric field increased above a threshold value is applied, the focal conic texture is switched into a homeotropic texture where the helical structure is unwound with the liquid crystal director aligned in the cell normal direction. The homeotropic texture can let the incident light go through, i.e. one can see through the window.

Polymer networks can be formed by ultraviolet light induced polymerization of monomer(s). Polymer networks are formed from some quantity of reactive monomer(s) and photoinitiator in the cholesteric liquid crystal. The amount of chiral dopant can be adjusted to produce the desired cholesteric pitch. After the desired texture is established through the combination of surface preparations and applied field, the ultraviolet light is used to photopolymerize the sample. The morphology of the resulting polymer network mimics the textures of initial cholesteric mesophases in the preparation. With the presence of polymer networks, the liquid crystal material is broken up into small domains referred to as poly-domains in the focal conic texture. The network influences the structure of the focal conic state and stabilizes initial states. Factors controlling morphology are related to LC texture, monomer concentration, photopolymerization temperature, UV intensity, exposure time etc. The presence of a polymer network provides similar advantages in enhancing the stability of the structure, aiding in the return of the LC orientation to the desired stable configuration, reducing the switching time, and helping to determine and maintain the poly-domain size.

Photochromism is usually used to describe compounds that undergo a reversible photochemical transformation where an absorption band in the visible electromagnetic spectrum changes dramatically in intensity or wavelength. In many cases, this can be described as a reversible change of color upon electromagnetic radiation. Photochromic compounds may be thermally reversible or thermally irreversible. Thermally reversible photochromic compounds such as spiropyrans, spirooxazines, benzopyrans, naphthopyrans are generally capable of switching from a first state, e.g. a colorless state, to a second state, e.g. a color state, under electromagnetic radiation and reverting back to the colorless state in response to thermal energy or another wavelength electromagnetic radiation, i.e. relaxing back to the colorless state. Thermally irreversible photochromic compounds such as diarylethenes and fulgides are generally capable of switching from a first state, e.g. a colorless state, to a second state, e.g. a color state, under an electromagnetic radiation and reverting back to the colorless state only under another electromagnetic radiation.

SUMMARY OF THE INVENTION

The photochromic chiral nematic LC materials are desirable materials for a smart energy-saving window since these combine the unique properties of both photochromic material and chiral nematic LC. Like chiral nematic LC, the reflection wavelength of photochromic chiral nematic LC material can be adjusted based on the equation $\lambda=np=n(\beta x)^{-1}$. We can tune the reflected wavelength of photochromic chiral nematic liquid crystal at its planar state to the near IR region which is more related to heating. Like photochromic material, photochromic chiral nematic LC material can change the window transmittance by exposure to light. Thus transmittance change upon exposure to light and near-infrared modulation would be more useful and effective to utilize environmental energy by operating the different optical state of a planar state, a focal conic state and a homeotropic state upon the application of a low voltage pulse, a high voltage pulse or an electric filed.

The present invention provides smart photochromic chiral nematic LC windows capable of being darkened (colored) from colorless in the presence of sunlight irradiation but also controlling the light and the heat passing through them, which can save heating, lighting and air-conditioning costs, increase comfort, reduce glare from the sun, provide control over privacy and environment, and block harmful ultraviolet rays. The cost of blinds, curtains and drapes are also slashed and in many cases eliminated.

One aspect of the invention provides a photochromic chiral nematic liquid crystal device comprising at least a photochromic chiral nematic liquid crystal material sandwiched between the first and second transparent electrically conductive substrates, wherein the photochromic chiral nematic liquid crystal material is switchable from one state to another state among the three kinds of states, i.e. a planar state, focal conic state and homeotropic state, upon application of a low voltage pulse, a high voltage pulse, or a electric field. The photochromic chiral nematic liquid crystal material generally comprises a chiral photochromic material and a nematic liquid crystal or an achiral photochromic material, a chiral material and a nematic liquid crystal.

Another aspect of the invention provides smart photochromic chiral nematic LC windows capable of undergoing a color change, e.g. darkening upon exposure to sunlight irradiation but also controlling the light and the heat passing through them, which can save heating, lighting and air-conditioning costs, increase comfort, reduce glare from the sun, provide control over privacy and environment, and block harmful ultraviolet rays.

Still another aspect of the invention provides various photochromic chiral nematic liquid crystal materials and methods for forming the same.

In one aspect, a photochromic chiral nematic liquid crystal device is disclosed comprising at least a photochromic chiral nematic liquid crystal material disposed between first and second transparent electrically conductive substrates, wherein the photochromic chiral nematic liquid crystal material is switchable from one state to another state among three states: a) a planar texture, b) a focal conic texture and c) a homeotropic texture, upon application of one or more of a low voltage pulse, a high voltage pulse, or an electric field.

BRIEF DESCRIPTION OF THE DRAWINGS

The invention will be better understood and other features and advantages will become apparent by reading the detailed description of the invention, taken together with the drawings, wherein:

FIGS. 4A-4C schematically illustrate three kinds of chiral nematic states, wherein FIG. 4A, represents the planar texture wherein there exists some reflection and the transmittance can be changed upon varying exposure to light, FIG. 4B represents the focal conic texture that can be utilized to scatter light.

FIG. 6A-D illustrate an example of an embodiment of a device at the different states or textures, wherein

DETAILED DESCRIPTION OF THE INVENTION

The invention discloses a photochromic chiral nematic liquid crystal material, compositions and methods for producing the same. Multifunctional liquid crystal devices, for example windows are also disclosed along with methods for producing the same.

In one embodiment, the photochromic chiral nematic liquid crystal material is thermally reversible, which comprises at least a thermally reversible photochromic chiral compound and a nematic liquid crystal.

In one further embodiment, the photochromic chiral compounds have the following formula:

(Formula 1)

wherein X is C or N; and wherein at least one of $R_1$, $R_2$, $R_3$ and $R_4$ contains at least one chiral moiety which may be axially chiral, and the remaining groups, independently, are any group having chiral moiety, axially chiral moiety, hydrogen, halogen, $NO_2$, CN, O, S, N, C=N, N=N, CO, COO, OOC, C=C, C≡C, alkyl, an aromatic group, a polyaromatic group, a heterocyclic group, or a cycloalkyl group, or a combination thereof.

In a further embodiment, the photochromic chiral compounds have one of the following formulae:

(Formula 2)

(Formula 3)

wherein X is C or N; and wherein at least one group of $R_1$, $R_2$, $R_3$, $R_4$, $R_5$ and $R_6$ contains at least one chiral moiety which may be axially chiral, and the remaining groups, independently, are any group having chiral moiety, axially chiral moiety, hydrogen, halogen, $NO_2$, CN, O, S, N, C=N, N=N, CO, COO, OOC, C=C, C≡C, alkyl, an aromatic group, a polyaromatic group, a heterocyclic group, or a cycloalkyl group, or a combination thereof.

In yet a further embodiment, the photochromic chiral compounds have the following formula:

(Formula 4)

wherein X is C or N; and wherein at least one group of $R_1$, $R_2$, $R_3$, $R_4$, $R_5$ and $R_6$ contains at least one chiral moiety which may be axially chiral, and the remaining groups, independently are any group having any chiral moiety, axially chiral moiety, hydrogen, halogen, $NO_2$, CN, O, S, N, C=N, N=N, CO, COO, OOC, C=C, C≡C, alkyl, an aromatic group, a polyaromatic group, a heterocyclic group, or a cycloalkyl group, or a combination thereof.

Example Synthesis

The synthesis of one exemplary thermally reversible photochromic chiral compound 10-1 is illustrated in Scheme 1. The chiral compound was synthesized by reacting the photochromic intermediate 6 and the chiral intermediate 9 in the presence of the catalyst Pd(PPh$_3$)$_4$. The photochromic spirooxazine intermediate 6 was prepared starting from (4-bromo-phenyl)-hydrazine 1. The chiral intermediate 9 was prepared starting from (R)-(+)-1,1'-bi(2-naphthol) 9 or (S)-(−)-1,1'-bi(2-naphthol) 9. Such right-hand photochromic chiral spirooxazine 10-1 and left-hand photochromic chiral spirooxazine 10-1 were formed. When they were respectively doped in a nematic liquid crystal, a right-hand photochromic chiral nematic liquid crystal material and a left-hand photochromic chiral nematic liquid crystal material were obtained.

Scheme 1 Synthesis of the exemplary thermally reversible photochromic chiral spirooxazine 10-1.

As indicated hereinabove, the photochromic chiral nematic liquid crystal material comprises at least a thermally reversible photochromic achiral compound and a nematic liquid crystal. In one embodiment the photochromic achiral compounds have the following formula:

(Formula 5)

wherein X is C or N; and wherein each of $R_1$, $R_2$, $R_3$ and $R_4$, independently, comprise hydrogen, halogen, $NO_2$, CN, O, S, N, C=N, N=N, CO, COO, OOC, C=C, C≡C, alkyl, an aromatic group, a polyaromatic group, a heterocyclic group, or a cycloalkyl group, or a combination thereof.

Still additional embodiments of photochromic achiral compounds have one of the following formulae:

(Formula 6)

An additional embodiment of a photochromic achiral compound has the following formula:

(Formula 8)

wherein X is C or N; and wherein each of $R_1$, $R_2$, $R_3$, $R_4$ and $R_5$ independently comprise hydrogen, halogen, $NO_2$, CN, O, S, N, C=N, N=N, CO, COO, OOC, C=C, C≡C, alkyl, an aromatic group, a polyaromatic group, a heterocyclic group, or a cycloalkyl group, or a combination thereof.

The photochromic liquid crystal compounds of the present invention have the important ability to change from a relatively colorless form to a colored form upon exposure to electromagnetic radiation. Scheme 2 set forth below illustrates thermally reversible photochromism of a spiropyran wherein in Formula 2 and/or Formula 6 X is a carbon atom and a spirooxazine in said formula when X is a nitrogen atom.

(Scheme 2)

Colorless Form          Colored Form

-continued (Formula 7)

wherein X is C or N; and wherein each of $R_1$, $R_2$, $R_3$, $R_4$, and $R_5$ independently comprise hydrogen, halogen, $NO_2$, CN, O, S, N, C=N, N=N, CO, COO, OOC, C=C, C≡C, alkyl, an aromatic group, a polyaromatic group, a heterocyclic group, or a cycloalkyl group, or a combination thereof.

The photochromic chiral nematic liquid crystal composition also includes a nematic liquid crystal. Nematic liquid crystals are molecules that generally have no positional order but tend to align in the same direction, for example, along an alignment layer or director. The nematic liquid crystal can be one or a mixture of different materials as known in the art and are chosen to achieve a desired performance. Examples of suitable nematic liquid crystal materials include, but are not limited to E7, E31 or a mixture comprised of at least a cyan biphenyl component.

Additionally, in some embodiments the photochromic chiral nematic liquid crystal composition further includes a polymer network or a polymer matrix. Examples of suitable polymerizable monormers include, but are not limited to, acrylic acid, methacrylic acid, polyfunctional monomers, and their esters, e.g. acrylates, methacrylates such as isobutyl acrylate, stearyl acrylate, lauryl acrylate, isoamyl acrylate, 2-ethylhexyl acrylate, n-butyl methacrylate, n-lauryl methacrylate, tridecyl methacrylate; n-stearyl methacrylate, n-cyclohexyl methacrylate, benzyl methacrylate, isobornyl methacrylate, 2-phenoxyethyl methacrylate, 2,2,3,4,4,4-hexafluorobutyl methacrylate, 2,2,3,4,4,4-hexachlorobutyl methacrylate, 2,2,3,3-tetrachloropropyl methacrylate, 2,2,3,3-tetrachloropropyl methacrylate, perfluorooctylethyl methacrylate, perfluorooctylethyl acrylate, perchlorooctylethyl methacrylate, ethylene glycol dimethacrylate, bisphenol-A diacrylate, bisphenol-A dimethacrylate, 1,4-butanediol dimethacrylate, 1,6-hexanediol dimethacrylate, trimethylolpropane triacrylate, and tetramethylolmethane tetraacrylate.

Additionally, in some embodiments the photochromic chiral nematic liquid crystal composition further includes one or more other additives, such as but not limited to photoinitiator, UV-resistant material, nanoparticle and dye.

In an embodiment wherein chiral photochromic material and nematic liquid crystal material are present, the amount of the chiral photochromic material ranges in an amount generally from 0.01 to about 30 parts, desirably from 0.01 to about 10 parts and preferably from about 0.01 to about 6 parts by weight based on 100 total parts by weight of the photochromic nematic liquid crystal material layer. The nematic liquid crystal is present in an amount generally from 1 to about 99.9 parts, desirably from 50 to about 99.9 parts and preferably from about 80 to about 99.9 parts by weight based on 100 parts by weight of the photochromic nematic liquid crystal material layer.

In an embodiment where the photochromic nematic liquid crystal material comprises an achiral photochromic material, a chiral material and a nematic liquid crystal, the achiral photochromic material is present in an amount generally from 0.01 to about 30 parts, desirably from 0.01 to about 10 parts and preferably from about 0.1 to about 6 parts by weight based on 100 total parts by weight of the photochromic nematic liquid crystal material layer. The chiral material is present in an amount generally from 0.01 to about 30 parts, desirably from 0.1 to about 10 parts and preferably from about 0.1 to about 6 parts by weight based on 100 total parts by weight of the photochromic nematic liquid crystal material layer. The nematic liquid crystals are present in an amount generally from 1 to about 99.8, desirably from 50 to about 99.8 parts and preferably from about 80 to about 99.8 parts by weight based on 100 total parts by weight of the photochromic nematic liquid crystal material layer.

Figure 1:
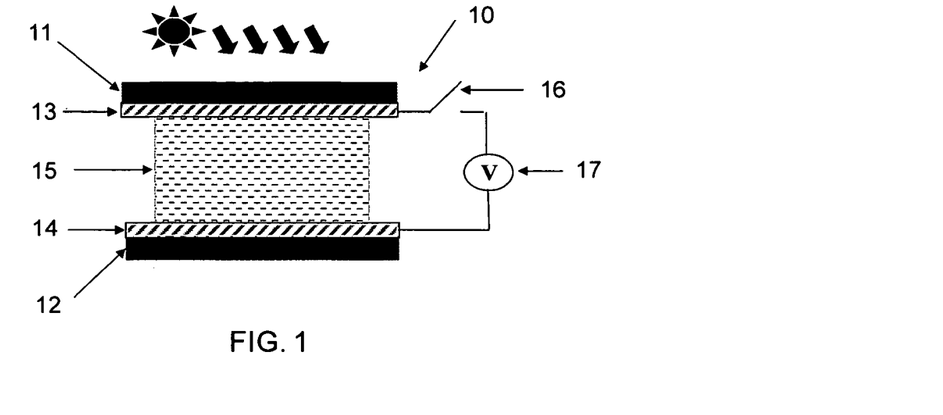
FIG. 1 is a cross-sectional side view that schematically illustrates a LC device using a photochromic chiral nematic LC material in an embodiment of the invention.

Referring now to the drawings, FIG. 1 illustrates a cross-sectional view of one embodiment of a liquid crystal device 10 of the present invention. Device 10 includes a pair of substrates 11, 12 that are preferably planar and disposed parallel to each other in one embodiment. The substrates 11, 12 can be maintained at a desired distance by a suitable spacer, not shown. The space between the substrates can vary depending upon the desired characteristics of a liquid crystal device 10 and range, in one embodiment from 0.001 to about 30 µm and preferably from about 0.1 to about 10 µm. A conductive electrode 14 is present on substrate 12 and a second conductive electrode 13 is present on substrate 11. Each electrode can have any number of input connections as known in the art, i.e. one or more, two or more, etc. An alignment layer can be present on one or more of the electrodes as known in the art. The photochromic chiral nematic liquid crystal layer 15 is located between substrates 11 and 12, in particular between electrode layers 13, 14. As utilized herein, the term "layer" does not require uniform thickness and imperfections or uneven thicknesses can be present so long as the layer performs its intended purpose.

In view of the preferred use of the device 10 as a window or other transparent construction through which light can be transmitted, the substrates are preferably transparent or substantially transparent. Various materials can be utilized as known in the art, such as various glasses, quartz, or a polymer with a glass being preferred.

The substrate is preferably a non-birefringent material, or aligned or compensated to minimize the effect of birefringence.

The conductive electrode layers 13, 14 can be deposited or placed on substrates 11, 12 by any known method. Photolithography can be utilized in one embodiment. Examples of suitable electrode materials include conductive polymers and metal oxides such as, but not limited to, tin oxide, tin oxide doped with, for example, Sb, F or P, indium oxide, indium oxide doped with Sn and/or F, antimony oxide, zinc oxide, indium tin oxide or a noble metal. The preferred electrode materials are indium tin oxide or conducting polymer.

In order to change the state of the photochromic liquid crystal material layer of the device 10, a voltage, 17, is applied by closing the switch 16. Preferably switch 16 is controlled by an electronic control and the applied voltage can be in the form of a desired voltage pulse in order to provide the liquid crystal device with the photochromic chiral nematic liquid crystal material layer having a desired phase.

Figure 2:
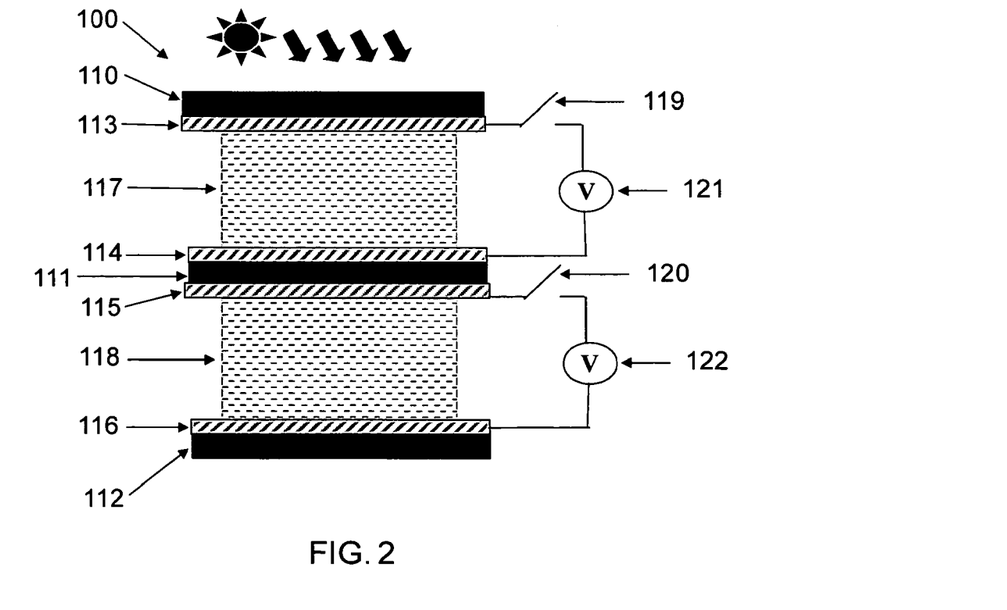
FIG. 2 is a cross-sectional side view that schematically illustrates a LC device comprising one left-handed photochromic chiral nematic LC material layer and another right-handed photochromic chiral nematic LC material layer in an embodiment of the invention.
Figure 3A:
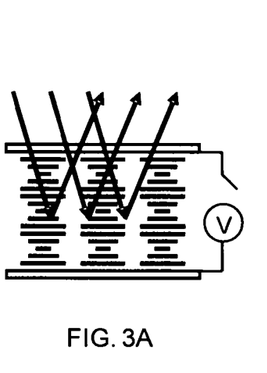
FIGS. 3A-3C are cross-sectional side views that schematically illustrate three chiral nematic states or textures, i.e. a planar state or texture (3A), a focal conic state or texture (3B) and a homeotropic state or texture (3C)
Figure 3B:
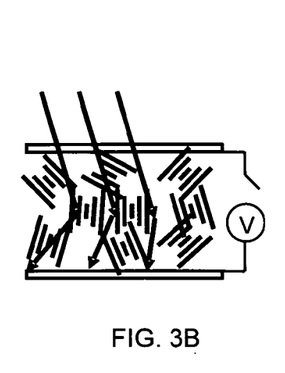
Figure 3C:
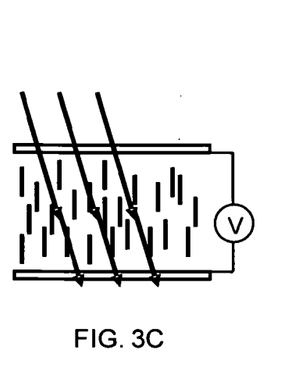
Figure 4A:
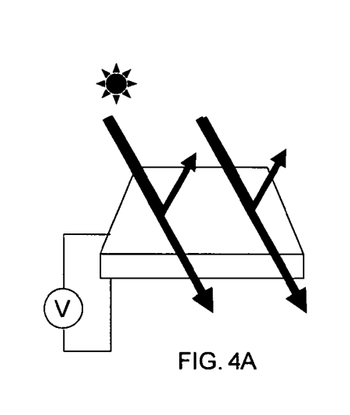
Figure 4B:
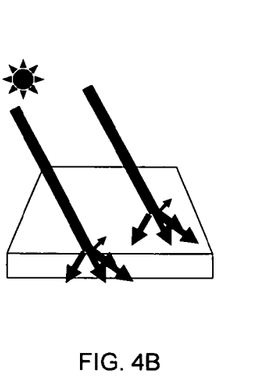
Figure 4C:
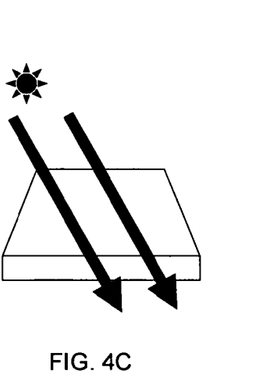
FIG. 4C represents the homeotropic texture wherein the liquid crystal device is transparent and light is allowed to pass through the device; wherein the black line represents ultra-violet light and visible light, and the grey line represents near infrared light.

FIG. 2 illustrates a cross-sectional view of one embodiment of a liquid crystal device 100 of the present invention including one left handed photochromic chiral nematic liquid crystal material layer 118 and a right handed photochromic chiral nematic liquid crystal material layer 117 or one right handed photochromic chiral nematic liquid crystal material layer 118 and a left handed photochromic chiral nematic liquid crystal material layer 117. Device 100 includes a pair of outer substrates 110, 112 and an inner substrate 111. A conductive electrode layer 116 is operatively connected to substrate 112, electrode layers 114 and 115 are disposed on opposite sides of substrate 111, and electrode layer 113 is disposed on substrate 110. Each photochromic chiral nematic liquid crystal material layer is provided with a voltage source, such as 121, 122 that is applied by a respective switch, 119, 120. The device can reflect both left and right circularly polarized light, i.e. the full reflection at the reflection region and preferably some in the near-infrared region.

In one embodiment, the photochromic chiral nematic liquid crystal material comprises at least a thermally reversible photochromic chiral material.

Any particular theory that is used in the description, as an attempt to academically explain the mechanisms of the inventions, should be interpreted as non-limitative to the scope of the invention.

Like conventional chiral nematic LC, photochromic chiral nematic LC located or sandwiched between two parallel transparent conductive substrates can form a planar texture, i.e. planar state, in the absence of an external electric field, which can selectively reflect light according to Bragg's law. The reflected wavelength of the photochromic chiral nematic liquid crystal is adjusted to near IR region which is more related to heating. It is achieved by adjusting the chiral dopant concentration in the nematic LC host. Due to the photochromatic nature of the photochromic chiral nematic LC material, the transmittance of this planar texture changes upon exposure to light. With a low electric pulse, the focal conic state, i.e. light-scatting state, is obtained. The focal conic state is used as control the privacy and the device can act as blinds, curtains and drapes, and block sunlight including most harmful ultraviolet rays. On applying a higher electric filed, its homeotropic state is maintained, i.e. light is allowed to pass through although its transmittance can be tuned by light as well. The three states can be modulated by light or switched by a low voltage pulse, a high voltage pulse or electricity depending on different purposes, which offers multi-functionality as well as energy-saving ability. It can save energy costs by taking heat when needed, and blocking it when it's not needed. For instance, with the homeotropic state, more sunlight can be transmitted in cold weather to assist in heating. With the planar state, less sunlight and heat are allowed to pass during warm periods to minimize overheating. With the focal conic state, the window allows not only blocking of sunlight including most harmful ultraviolet rays without curtains or blinds but also acts as the function of a curtain or blind for privacy control. Furthermore, maintaining the planar state or focal conic state doesn't require any electricity.

In various embodiments, a photochromic chiral nematic LC material sandwiched between two parallel transparent conductive substrates can form the planar state or texture capable of reflecting the electromagnetic radiation selected from gamma ray, X-ray, UV-visible light, infrared radiation, any combination of thereof. In preferred embodiments, the planar texture can reflect some near-infrared radiation from sunlight which is related to heating. The photochromic chiral nematic liquid crystal material can change color by exposure to electromagnetic radiation which is selected from gamma ray, X-ray, UV light, visible light, infrared radiation, and any combination thereof. In a specific embodiment, the electromagnetic radiation is solar light. The photochromic chiral nematic liquid crystal material can change color from colorless to color upon solar light irradiation.

In various embodiments, the photochromic chiral nematic LC material sandwiched between two parallel transparent conductive substrates can be switched from one state to another state among the three kinds of state, i.e. a planar state, focal conic state and homeotropic state, upon application of a low voltage pulse, a high voltage pulse, or an electric field.

In an embodiment, the photochromic chiral nematic LC device or window can darken when the sun is brightest but gradually lighten as the sunlight diminishes, providing the function similar to photochromic sunglasses and keep the building or vehicle cool especially during hot weather. In darkness, the LC device may be thermally relaxed to colorless.

The photochromic chiral nematic liquid crystal material is thermally reversible, i.e. it can switch from a first state, e.g. a colorless state, to a second state, e.g. a colored state, under an electromagnetic radiation, e.g. sunlight, and revert back to the colorless state in response to thermal energy, i.e. relaxing back to the colorless state.

Figure 5:
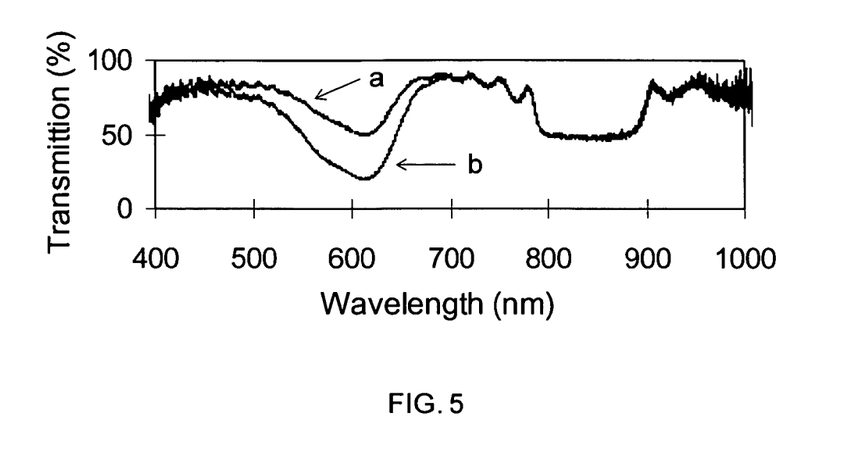
FIG. 5 illustrates the change of reflective spectra of 6.25% of a synthesized thermally reversible photochromic chiral compound in nematic liquid crystal E7 in a 5 μm thick cell at its planar state after light irradiation for a time (a: initial state, b: with light irradiation.
Figure 6A:
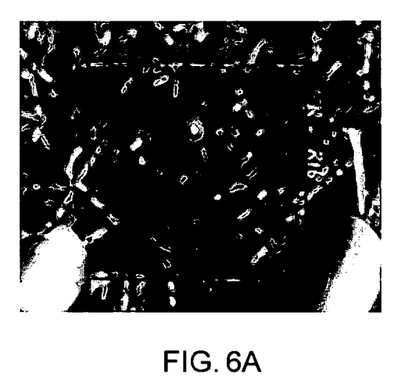
FIG. 6A is the planar texture or state upon initial exposure to sunlight.
Figure 6B:
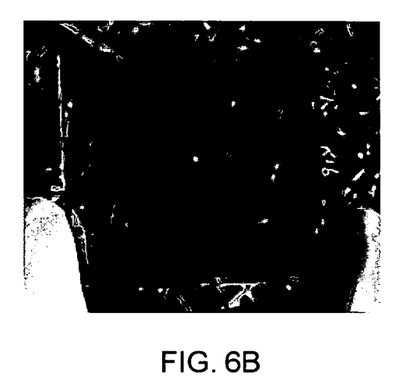
FIG. 6B is the planar or texture state after exposure to sunlight.
Figure 6C:
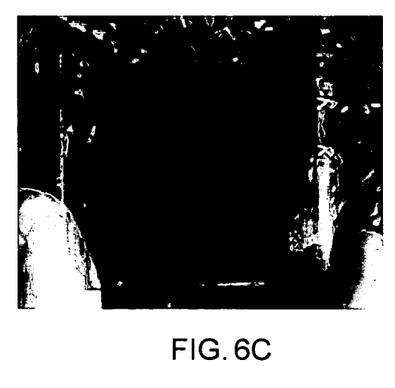
FIG. 6C is a focal conic state achieved by the application of a low voltage pulse.
Figure 6D:
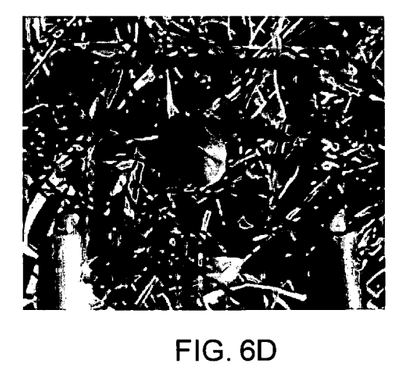
FIG. 6D is a homeotropic state achieved by the application of a high electric field.

In various embodiments, the photochromic chiral nematic liquid crystal material in its planar state can reflect at least some near-infrared radiation from sunlight but it is transparent. FIG. 5 is an example of reflective spectra of an exemplary photochromic chiral nematic liquid crystal material comprising 6.25% thermally reversible photochromic chiral compound in nematic liquid crystal E7 in a 5 μm thick cell in a planar texture or state. As can be seen from FIG. 5 the photochromic chiral nematic liquid crystal material at its planar state can reflect some near-infrared light (~800-900 nm). With light irradiation, the transmittance is changed but the cell is transparent.

In various embodiments, the photochromic chiral nematic liquid crystal material in its homeotropic state can let light through and it is transparent.

In various embodiments, the photochromic chiral nematic liquid crystal material in its focal conic state is light-scattering, which is used to control privacy and act as blinds, curtains and drapes, and block sunlight including most harmful ultraviolet rays.

In various embodiments, the photochromic chiral nematic liquid crystal sandwiched between two parallel transparent conductive substrates can form a planar state (reflection state) upon the application of a high voltage pulse.

In various embodiments, the photochromic chiral nematic liquid crystal sandwiched between two parallel transparent conductive substrates can form its focal conic state (light-scatting state) from a planar state upon the application of a low voltage pulse or from a homeotropic state (transparent state) by the removal from electrical field followed by the application of a low voltage pulse.

In various embodiments, the photochromic chiral nematic liquid crystal sandwiched between two parallel transparent conductive substrates can form a homeotropic state (transparent state) upon the application of a high voltage from a planar state or a focal conic state.

In various embodiments, the focal conic state and planar state do not require a voltage to maintain.

In various embodiments, the photochromic chiral nematic liquid crystal material is either left-handed or right-handed.

In an embodiment, the voltage pulse and the voltage are an amplitude voltage pulse and an amplitude voltage, respectively.

In an embodiment, the voltage pulse and the voltage are a frequency-dependence voltage pulse and a frequency-dependence voltage, respectively.

In an embodiment, the device or window comprises at least one left-handed photochromic chiral nematic liquid crystal layer and one right-handed photochromic chiral nematic liquid crystal layer.

In an embodiment, the device is used as the windows of buildings and vehicles, and glass walls for offices, libraries, greenhouses, conference rooms, lobbies, store fronts, bathrooms, entryways, family rooms, bedrooms, skylights, and the other like applications. FIGS. 6A-D are examples of an embodiment device at the different states (A: the planar state upon initial exposure to sunlight; B: the planar state after exposure to sunlight; C: a focal conic state by the application of a low voltage pulse e.g. 22 V; and D: the homeotropic state by the application of a high electric field, e.g. 50 V).

While in accordance with the patent statutes the best mode and preferred embodiment have been set forth, the scope of the invention is not limited thereto, but rather by the scope of the attached claims.

What is claimed is:

1. A photochromic chiral nematic liquid crystal device, comprising: at least a photochromic chiral nematic liquid crystal material disposed between first and second transparent electrically conductive substrates, wherein the photochromic chiral nematic liquid crystal material is switchable from one state to another state among three states: a) a planar texture, b) a focal conic texture and c) a homeotropic texture, upon application of one or more of a low voltage pulse, a high voltage pulse, or an electric field, and wherein said photochromic chiral nematic liquid crystal material changes color upon exposure to electromagnetic radiation of one or more of gamma ray, X-ray, UV light, visible light, and infrared radiation.

2. The device of claim 1, wherein said photochromic chiral nematic LC material in the planar state can reflect electromagnetic radiation of one or more of gamma ray, X-ray, UV-visible light, and infrared radiation.

3. The device of claim 1, wherein said photochromic chiral nematic LC material in the planar state can reflect at least some near-infrared radiation from sunlight.

4. The device of claim 1, wherein said photochromic chiral nematic liquid crystal material is thermally reversible.

5. The device of claim 1, wherein said photochromic chiral nematic liquid crystal material changes color upon solar light irradiation.

6. The device of claim 5, wherein said photochromic chiral nematic liquid crystal material changes color from colorless to color upon solar light irradiation.

7. The device of claim 1, wherein said photochromic chiral nematic liquid crystal material comprises at least a photochromic chiral material and a nematic liquid crystal material.

8. The device of claim 7, wherein the photochromic chiral nematic liquid crystal material further includes one or more of a polymer network and a polymer matrix.

9. The device of claim 7, wherein said photochromic chiral nematic liquid crystal material further includes at least a thermally reversible photochromic chiral material.

10. The device of claim 1, wherein said photochromic chiral nematic liquid crystal material comprises at least an achiral photochromic material, a chiral material and a nematic liquid crystal material.

11. The device of claim 1, wherein said photochromic chiral nematic liquid crystal material comprises at least an achiral photochromic material, a chiral material, a nematic liquid crystal material and one or more of a polymer network and a polymer matrix.

12. The device of claim 1, wherein in the planar state said photochromic chiral nematic liquid crystal material is transparent.

13. The device of claim 1, wherein in the homeotropic state said photochromic chiral nematic material is transparent.

14. The device of claim 1, wherein in the focal conic state said photochromic chiral nematic liquid crystal material is light-scattering.

15. The device of claim 1, wherein the planar state of said photochromic chiral nematic liquid crystal is obtained by the application of a high voltage pulse.

16. The device of claim 1, wherein the focal conic state of said photochromic chiral nematic liquid crystal is switched from the planar state upon the application of a low voltage pulse.

17. The device of claim 1, wherein the homeotropic state of said photochromic chiral nematic liquid crystal is switched from the planar state upon the application of high electric field.

18. The device of claim 1, wherein the planar state of said photochromic chiral nematic liquid crystal is switched from the homeotropic state upon the removal of electrical field.

19. The device of claim 1, wherein the focal conic state of said photochromic chiral nematic liquid crystal is switched from the homeotropic state upon the removal of electrical field followed by the application of a low voltage pulse.

20. The device of claim 1, wherein both the focal conic state and planar state do not require an electric field to maintain.

21. The device of claim 1, wherein said photochromic chiral nematic liquid crystal material is left-handed.

22. The device of claim 1, wherein said photochromic chiral nematic liquid crystal material is right-handed.

23. The device of claim 7, wherein said photochromic chiral material has the formula:

wherein X is C or N; and at least one group among $R_1$, $R_2$, $R_3$ and $R_4$ contains at least one chiral moiety which may be axially chiral, and the remaining groups, independently, are any group having chiral moiety, axially chiral moiety, hydrogen, halogen, $NO_2$, CN, O, S, N, C=N, N=N, CO, COO, OOC, C=C, C≡C, alkyl, an aromatic group, a polyaromatic group, a heterocyclic group, or a cycloalkyl group, or a combination thereof.

24. The device of claim 7, wherein said photochromic chiral material has the formula:

or a combination thereof, wherein X is C or N; and at least one group among $R_1$, $R_2$, $R_3$, $R_4$, $R_5$, and $R_6$ contains at least one chiral moiety which may be axially chiral, and the remaining groups, independently, are any group having chiral moiety, axially chiral moiety, hydrogen, halogen, $NO_2$, CN, O, S, N, C=N, N=N, CO, COO, OOC, C=C, C≡C, alkyl, an aromatic group, a polyaromatic group, a heterocyclic group, or a cycloalkyl group, or combination thereof.

25. The device of claim 7, wherein said photochromic chiral material has the formula:

wherein X is C or N; and at least one group among $R_1$, $R_2$, $R_3$ and $R_4$ contains at least one chiral moiety which may be axially chiral, and the remaining groups, independently are any group having chiral moiety, axially chiral moiety, hydrogen, halogen, $NO_2$, CN, O, S, N, C=N, N=N, CO, COO, OOC, C=C, C≡C, alkyl, an aromatic group, a polyaromatic group, a heterocyclic group, a cycloalkyl group, and combination thereof.

26. The device of claim 10, wherein said achiral photochromic material has the formula:

wherein X is C or N; and wherein each of $R_1$, $R_2$, $R_3$ and $R_4$ independently, comprise hydrogen, halogen, $NO_2$, CN, O, S, N, C=N, N=N, CO, COO, OOC, C=C, C≡C, alkyl, an aromatic group, a polyaromatic group, a heterocyclic group, or a cycloalkyl group, or a combination thereof.

27. The device of claim 10, wherein said achiral photochromic material has the formula or a combination thereof, wherein X is C or N; and wherein each of $R_1$, $R_2$, $R_3$, $R_4$, $R_5$ and $R_6$ independently, comprise hydrogen, halogen, $NO_2$, CN, O, S, N, C=N, N=N, CO, COO, OOC, C=C, C≡C, alkyl, an aromatic group, a polyaromatic group, a heterocyclic group, or a cycloalkyl group, or a combination thereof.

28. The device of claim 10, wherein said achiral photochromic material has the formula:

wherein X is C or N; and wherein each of $R_1$, $R_2$, $R_3$, $R_4$ and $R_5$ independently, comprise hydrogen, halogen, $NO_2$, CN, O, S, N, C=N, N=N, CO, COO, OOC, C=C, C≡C, alkyl, an aromatic group, a polyaromatic group, a heterocyclic group, or a cycloalkyl group, or a combination thereof.

29. The device according to claim 1, which is able to not only darken in color from colorless upon exposure to sunlight irradiation but also control light and heat passing through the planar state, focal conic state or the homeotropic state controlled by a high voltage pulse, a low voltage pulse or a high voltage.

30. The device of claim 1, wherein a voltage pulse and a voltage is an amplitude voltage pulse and an amplitude voltage, respectively.

31. The device of claim 1, wherein a voltage pulse and a voltage is a frequency-dependence voltage pulse and a frequency-dependence voltage, respectively.

32. The device of claim 1, which comprises at least one left-handed photochromic chiral nematic liquid crystal layer and one right-handed photochromic chiral nematic liquid crystal layer.

33. The device of claim 1, wherein said first and second transparent conductive substrates independently include a conductive material comprising one or more of tin oxide, tin oxide doped with Sb, F or P, indium oxide, indium oxide doped with Sn and/or F, antimony oxide, zinc oxide and a noble metal, and wherein the substrate comprises one or more of a glass plate, quartz plate, plastic plate, and polymer plate.

34. The device of claim 1, wherein said first and second transparent conductive substrates independently coat an alignment layer.

* * * * *